(12) United States Patent
Wakasa (10) Patent No.: US 10,046,577 B2
(45) Date of Patent: Aug. 14, 2018

(54) PRINTING DEVICE, PRINTING SYSTEM, AND CONTROL METHOD OF A PRINTING DEVICE

(71) Applicant: SEIKO EPSON CORPORATION, Tokyo (JP)

(72) Inventor: Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/610,065

(22) Filed: May 31, 2017

(65) Prior Publication Data
US 2017/0348987 A1    Dec. 7, 2017

(30) Foreign Application Priority Data
Jun. 1, 2016  (JP) ................................ 2016-109734

(51) Int. Cl.
| | | |
|---|---|---|
| G06F 3/12 | (2006.01) | |
| G06K 15/02 | (2006.01) | |
| B41J 13/00 | (2006.01) | |
| B41J 15/04 | (2006.01) | |

(52) U.S. Cl.
CPC .......... B41J 13/0009 (2013.01); B41J 15/04 (2013.01); G06F 3/1218 (2013.01); G06K 15/022 (2013.01)

(58) Field of Classification Search
CPC . G06K 1/00; G06K 1/12; G06K 15/02; G06F 3/1219; G06F 3/1218
See application file for complete search history.

(56) References Cited

U.S. PATENT DOCUMENTS

| | | | | |
|---|---|---|---|---|
| 8,619,304 | B2* | 12/2013 | Lombardo ............ | G06F 3/1219 358/1.13 |
| 8,891,125 | B2* | 11/2014 | Sprague ................ | G06F 3/1254 358/1.11 |
| 2011/0097099 | A1* | 4/2011 | Matsumoto ........... | G06F 3/1219 399/81 |

FOREIGN PATENT DOCUMENTS

| | | | | |
|---|---|---|---|---|
| JP | 2010-006022 A | | 1/2010 | |
| JP | 2010-012667 A | | 1/2010 | |
| JP | 2010-12668 | * | 1/2010 | ............... G06F 3/12 |
| JP | 2010-012668 A | | 1/2010 | |
| JP | 2010-017933 A | | 1/2010 | |
| JP | 2011-090558 A | | 5/2011 | |
| JP | 2013-129160 A | | 7/2013 | |
| JP | 2015-189104 A | | 11/2015 | |

OTHER PUBLICATIONS

Computer-generated translation of JP 2010-012668, published on Jan. 2010.*

* cited by examiner

Primary Examiner — Huan Tran
(74) Attorney, Agent, or Firm — Foley & Lardner LLP (57) ABSTRACT

A printing device can reduce the length of roll paper that is printed, and enables easily knowing how much the printed length of roll paper was reduced. A printer 200 has a print unit 240 that conveys roll paper in the conveyance direction H and executes a printing process of printing images on the roll paper; a reduction processor 222 that controls the print unit 240 in the printing process to reduce the length of roll paper to which images are printed in the conveyance direction; a calculator 223 that calculates how much the printed length of roll paper was reduced in the printing process; and a display unit 252 that displays information indicating the reduction in the printed length of the roll paper calculated by the calculator 223.

8 Claims, 6 Drawing Sheets

PRINTING DEVICE, PRINTING SYSTEM, AND CONTROL METHOD OF A PRINTING DEVICE

This application claims priority under 35 U.S.C. § 119 to Japanese Patent Application No. 2016-109734 filed on Jun. 1, 2016, the entire disclosure of which is expressly incorporated by reference herein.

BACKGROUND

1. Technical Field

The present invention relates to a printing device, a printing system, and a control method of a printing device.

2. Related Art

Printing devices (printers) with functions for reducing paper consumption, such as a duplex printing function for printing images on both sides of a sheet of paper, and an N-up printing function for reducing and printing images of multiple pages on a single sheet of paper, are known from the literature. Technology for calculating the reduction in the amount of paper consumed using these functions has also been proposed (JP-A-2013-129160). JP-A-2013-129160 teaches an image processing device having a calculating means that monitors printing and computes a paper reduction rate in a specific time unit as an indicator of the reduction in paper consumption as a result of duplex printing or N-up printing.

Technology for reducing consumption of continuous paper by a printing device that prints to roll paper or other continuous media is described in JP-A-2010-12667. JP-A-2010-12667 discloses a print ing device that determines if the height of a barcode contained in the print data exceeds a specific height threshold, and if the specific height threshold is exceeded, reduces the printed height of the barcode to print a barcode of a specific height.

However, the literature is silent about a means of quantifying the reduction in roll paper consumption in a printing device that prints images on roll paper, and the related art does not sufficiently prompt users to print using environmentally-friendly methods.

SUMMARY

An objective of the present invention is to provide a printing device, a printing system, and a control method of a printing device enabling reducing the printed length of roll paper and easily knowing the reduction in the printed length of the roll paper.

To achieve the foregoing objective, a printing device according to the invention includes a print unit configured to convey roll paper in a conveyance direction and print images on the roll paper based on a received print command; a controller configured to control the print unit to reduce the length of roll paper printed in the conveyance direction based on the print command; a calculator that computes the reduction by the controller in the printed length of roll paper; and a display unit that displays information indicating the reduction in the printed length of roll paper calculated by the calculator.

In this aspect of the invention, the controller calculates the reduction in the length of roll paper that is printed, and displays the calculated printed length of roll paper on the display unit. The reduction in the length of roll paper that is printed can therefore be easily known.

In a printing device according to another aspect of the invention, the controller reduces the length of the roll paper printed by the print command in the conveyance direction by executing at least one of reducing a margin in the conveyance direction, shortening a barcode height in the conveyance direction, and reducing the line spacing.

In this configuration, at least one of reducing a margin in the conveyance direction, shortening a barcode height in the conveyance direction, and reducing the line spacing is executed to reduce the length of the portion of the roll paper printed in the conveyance direction.

In a printing device according to another aspect of the invention, the calculator calculates a reduction rate in the roll paper per unit quantity based on the reduction by the controller in the printed length of the roll paper; and the display unit displays information indicating the roll paper reduction rate calculated by the calculator.

This configuration calculates and displays the reduction rate per unit quantity of roll paper. As a result, how much roll paper consumption was reduced compared with not reducing the length of roll paper printed in the printing process can be shown.

A printing device according to another aspect of the invention also includes: storing information related to the width of the roll paper; the calculator calculating the reduction by the controller in the area of roll paper consumed based on the reduction by the controller in the printed length of the roll paper, and information related to the width of the roll paper; and the display unit displaying information indicating the reduction in the area of the roll paper consumed calculated by the calculator.

This configuration calculates and displays how much the printed area of the roll paper was reduced by the controller. How much consumption of the roll paper was reduced can therefore be expressed in terms of the area of the roll paper.

In a printing device according to another aspect of the invention, the printing device can connect to a control device; and the controller, based on a control command received from the control device, sends to the control device information indicating the reduction in the printed length of roll paper.

The printing device in this configuration sends to the control device, based on a control command received from the control device, information indicating the reduction in the printed length of roll paper. The control device can therefore acquire information indicating the reduction in the printed length of roll paper, and the control device can display the acquired information or execute a process using the acquired information.

In a printing device according to another aspect of the invention, the printing device has volatile storage that temporarily stores information indicating the reduction in the printed length of roll paper calculated by the calculator, and nonvolatile storage that cumulatively stores information indicating the reduction in the printed length of roll paper calculated by the calculator; and the controller, based on a control command received from the control device, sends to the control device information stored in the volatile storage indicating the reduction in the printed length of roll paper calculated by the calculator, or the cumulative information stored in the nonvolatile storage indicating the reduction in the printed length of roll paper calculated by the calculator.

This configuration sends to the control device information stored in the volatile storage indicating the reduction in the printed length of roll paper, or the cumulative information stored in the nonvolatile storage indicating the reduction in the printed length of roll paper.

The control device can therefore display the reduction in the printed length of content printed between when the printing device turned on and then turned off. The control device can also calculate and display the cumulative reduction in the printed length of roll paper.

Another aspect of the invention is a printing system including a printing device and a control device connected to the printing device. The printing device includes a print unit configured to convey roll paper in a conveyance direction and print images on the roll paper based on a received print command; a printing device controller configured to control the print unit to reduce the length of roll paper printed in the conveyance direction based on the print command; a calculator that computes the reduction by the printing device controller in the printed length of roll paper; and a printing device display unit that displays information indicating the reduction in the printed length of roll paper calculated by the calculator. The printing device controller sends to the control device information indicating the reduction in the printed length of roll paper. The control device includes a terminal controller that calculates a value representing the roll paper reduction effect based on information received from the printing device indicating the reduction in the printed length of roll paper; and a terminal display unit that displays the value representing the roll paper reduction effect calculated by the terminal controller.

The control device in this configuration, based on information indicating the reduction in the printed length of roll paper received from the printing device, calculates and displays a value indicating the roll paper reduction effect on the terminal display unit.

Another aspect of the invention is a control method of a printing device configured to convey roll paper in a conveyance direction and print images on the roll paper based on a received print command, the control method including: controlling printing to reduce the length of roll paper printed in the conveyance direction based on the print command; computing the reduction in the printed length of roll paper; and displaying information indicating the printed length of roll paper that was calculated.

This configuration calculates the reduction in the printed length of roll paper, and displays the printed length of roll paper that was calculated. The reduction in the length of roll paper printed can therefore be easily known.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
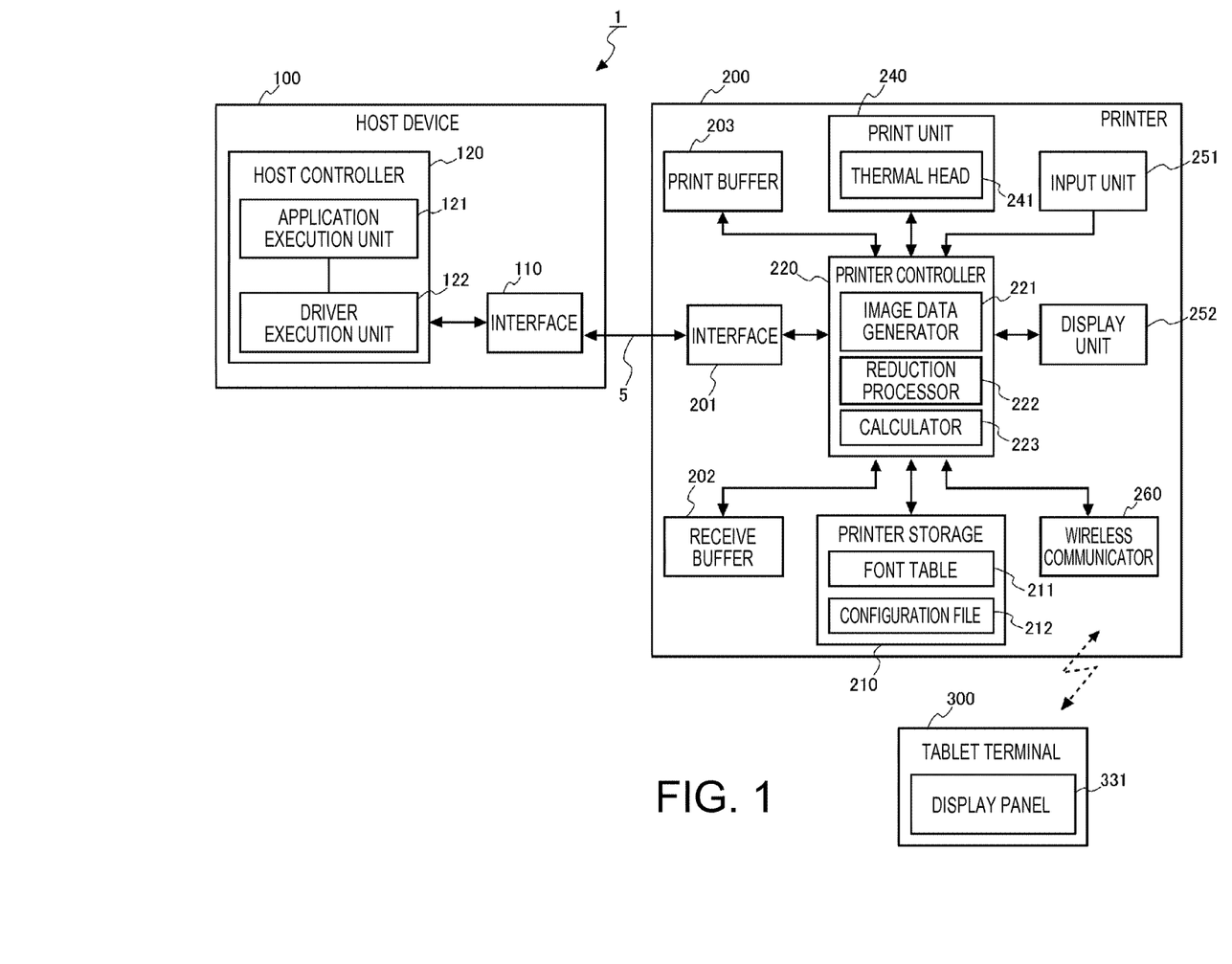
FIG. 1 is a block diagram illustrating the configuration of a printing system.

FIG. 1 is a function block diagram illustrating the configuration of a printing system 1.

The printing system 1 includes a host computer (referred to below as a host device) 100, printer 200, and tablet terminal 300. The printer 200 is an example of a printing device according to the invention. The tablet terminal 300 is an example of a control device according to the invention.

The host device 100 connects to the printer 200, and sends print commands and print data to the printer 200. A print command is a command that controls the printer 200 and causes the printer 200 to execute a printing process. Print data is data specifying the image (referred to below as a print image) to print on the print medium in the printing process. A print image may include text, symbols, images of barcodes (referred to below as barcode images), and figures (graphics). The printing process is a process of printing print images on print media.

Based on the print commands and print data received from the host device 100, the printer 200 prints print images on the print medium. In this example, the printer 200 prints receipts on roll paper as the print medium. Note that the printer 200 is not limited to printing receipts, and may print any content that can be printed by a thermal printer, including labels, coupons, tickets, and restaurant orders. The print medium is also not limited to roll paper, and fanfold paper previously folded to a specific size may also be used as the print medium.

The tablet terminal 300 connects to the printer 200, and receives and displays information sent from the printer 200 on a display panel 331.

The host device 100 and printer 200 are connected through a communication path 5. The communication path 5 may be a communication cable or a wireless connection. For example, the communication path 5 may be a USB, IEEE-1284, IEEE-1394, RS-232C or other serial communication cable for a 1:1 connection. The communication path 5 may also be a wired Ethernet® network connection. Further alternatively, the communication path 5 may be a near-field communication or wireless LAN connection such as a Bluetooth® or Wireless USB connection, for example.

Furthermore, FIG. 1 illustrates a 1:1 connection between the host device 100 and printer 200, but the number of printers 200 connected to the host device 100 is not specifically limited.

The host device 100 is a computer operated by a user, and the host device 100 may be, for example, a desktop computer, a notebook computer, or a tablet computer. The host device 100 may also be a smartphone or cell phone, for example.

The host device 100 has an interface 110 through which one or more printers 200 connect. The interface 110 handles communication with the printer 200 through the communication path 5. The interface 110 may be a wired communication interface such as USB, IEEE-1284, IEEE-1394, RS-232C, or Ethernet. The interface 110 may also be a wireless communication interface such as Bluetooth, Wireless USB, or other wireless LAN interface.

The 10 has a host controller 120 that controls other parts of the host device 100.

The host controller 120 has a CPU, ROM, RAM, and other peripheral circuits not shown. A basic control program (operating system) that is run by the CPU, and application programs, are stored in the ROM of the host controller 120. The basic control program and application programs are read into RAM, and the CPU controls parts of the host device 100 by executing the basic control program and application programs from RAM.

Function blocks of the host controller 120 include an application execution unit 121, and a driver execution unit 122. The application execution unit 121 and driver execution unit 122 are represented for convenience as function blocks embodied by the CPU executing the basic control program and application programs, and do not mean specific application and hardware configurations.

To control the printer 200 to print a receipt, for example, the application execution unit 121 generates receipt information, which is information for printing a receipt. The receipt information may include, for example, a logo to be printed on the receipt, information indicating when the receipt was printed, the name, quantity, price, and related tax information for the products purchased by the customer, the transaction total, the payment received from the customer, change due to the customer, and barcode information, for example. Information such as the store code and checkout register number indicating where the receipt was printed, the date, receipt number (transaction identifier), or other information may be encoded in the barcode. The data in the barcode generated by the application execution unit 121 may be encoded using a desirable barcode standard such as JAN, EAN, UPC, ITF, CODE 39, CODE 128, or NW-7, or using a proprietary barcode language.

The driver execution unit 122 executes a printer driver and generates the print commands and print data that cause the printer 200 to print the receipt information generated by the application execution unit 121. The driver execution unit 122 sends the generated print commands and print data through the interface 110 to the printer 200.

The print commands are commands in the command language of the printer 200, and are commands for controlling the printer 200 to execute a printing process. The print commands may further include text print commands instructing the printer 200 to print text, barcode print commands for printing barcodes, and image print commands for printing images (graphics).

The print data is data representing the images to print on the receipt. Included in the print data may be character codes specifying characters, parameters specifying the barcode, and image data indicating a logo or other graphic.

Based on the print commands and print data received from the host device 100, the printer 200 prints images on the roll paper stored inside the case (not shown in the figure) of the printer 200.

The printer 200 has an interface 201, receive buffer 202, print buffer 203, printer storage 210, printer controller 220, print unit 240, input unit 251, display unit 252, and wireless communicator 260.

The interface 201 is connected to the host device 100 through the communication path 5, and communicates with the host device 100 according to a specific communication protocol as controlled by the printer controller 220. The communication protocol of the interface 201 may be a wired communication interface such as USB, IEEE-1284, IEEE-1394, RS-232C or other serial communication standard, or a wireless communication interface such as Bluetooth®, Wireless USB, or other wireless LAN protocol.

The print commands and print data received through the interface 201 are stored in the receive buffer 202. Print images (image data) the printer controller 220 generates based on the print commands and print data are rendered in the print buffer 203.

The receive buffer 202 and print buffer 203 may be configured as storage areas in RAM accessible to the printer controller 220, or in auxiliary storage devices externally connected to the printer controller 220.

The printer storage 210 (nonvolatile memory) is a nonvolatile storage device used to store a font table 211 and configuration file 212. The font table 211 and configuration file 212 are tables the printer controller 220 references when generating the print image.

The font table 211 is a table storing font data, and the font data is font information indicating a font that the printer 200 can print.

The configuration file 212 is a file registering the font size, character spacing, line spacing, paper size, margin information, and other configuration information. The font size is information indicating the character size expressed by the number of dots vertically and horizontally. The character spacing is information indicating in dots the width of the white space formed between adjacent characters. The line spacing is information indicating in dots the width (height) of the white space between adjacent lines of text. The paper size is information indicating the size of the width of the roll paper used in the printer 200. The margin information is information indicating the width of the blank white space (that is, the margins) formed at the top, bottom, left and right edges of the roll paper.

The printer storage 210 cumulatively stores information indicating the reduction in the printed length of roll paper calculated by the calculator 223 as described below. More specifically, the printer storage 210 stores information indicating the reduction in the printed length of roll paper that was calculated by the calculator 223 (referred to below as the paper reduction information) even after the printer 200 power turns off.

The printer controller 220 has a CPU, ROM, RAM (volatile memory), and other peripheral circuits not shown, and controls other parts of the printer 200. ROM stores firmware, which is a control program of the printer 200. The CPU controls parts of the printer 200 by reading firmware from ROM into RAM and then running the firmware. RAM is used as working memory by the CPU for operations. RAM also temporarily stores paper reduction information indicating the printed length calculated by the calculator 223 as described below indicating the reduction in the paper length.

Function blocks of the printer controller 220 include an image data generator 221, reduction processor 222, and calculator 223.

The reduction processor 222 is an example of a controller according to the invention. These function blocks are embodied by the CPU executing firmware read into RAM, and do not mean specific application and hardware configurations.

The image data generator 221 interprets the print commands stored in the receive buffer 202, and generates the data rendered in the print buffer 203.

For example, if a text print command is included in the print commands and character codes specifying text are included as print data, the image data generator 221 acquires the font data for the specified character codes from the font table 211. The image data generator 221 then outputs the acquired font data to the reduction processor 222.

When a barcode print command is included in the print commands, and parameters specifying a barcode are included in the print data, the image data generator 221 generates image data for the barcode corresponding to the specified parameters. The image data generator 221 outputs the generated barcode image data to the reduction processor 222.

When an image print command is included in the print commands, and image data specifying an image is included as print data, the image data generator 221 reads and outputs the image data from the receive buffer 202 to the reduction processor 222.

The font data and barcode image data the image data generator 221 outputs to the reduction processor 222 are generically referred to as image data below.

The reduction processor 222 references the configuration file 212 to render the image data input from the image data generator 221 in the print buffer 203 and generate the print images. More specifically, the reduction processor 222, based on the font size, character spacing, margins, and other parameters set in the configuration file 212, renders the input image data in the print buffer 203 and generates print images. The print images rendered in the print buffer 203 are then printed by the print unit 240.

Based on the line spacing set in the configuration file 212, the reduction processor 222 informs the print unit 240 of the number of steps to drive the stepper motor (not shown in the figure). The stepper motor is a motor that conveys the roll paper, and the number of steps corresponds to the number of pulses applied to the stepper motor. The conveyance distance (conveyance length) of the roll paper is set according to the number of steps. After one line is printed on the roll paper, the reduction processor 222 controls, by means of the number of steps the motor is driven, the distance that the roll paper is conveyed in order to print the next line. One line refers to the length of the range in which the thermal head 241 can print in the sub-scanning direction on the roll paper. The sub-scanning direction corresponds to the width of the roll paper, and is perpendicular to the conveyance direction in which the roll paper is conveyed by the conveyance mechanism of the print unit 240 described below.

When the operating mode of the printer 200 is set to a paper-saving mode, the reduction processor 222 executes a paper-saving process. The paper-saving process is a process that controls the print unit 240 to reduce the length that is printed in the conveyance direction of the roll paper during the printing process executed by the print unit 240 (described below). The printed (printing) length is the length of the roll paper in the conveyance direction when the image of one page is printed on the roll paper. The reduction processor 222 reduces the printed length by at least one of reducing the margin width, reducing the line spacing, and reducing the printed height of a barcode image.

Figure 2:
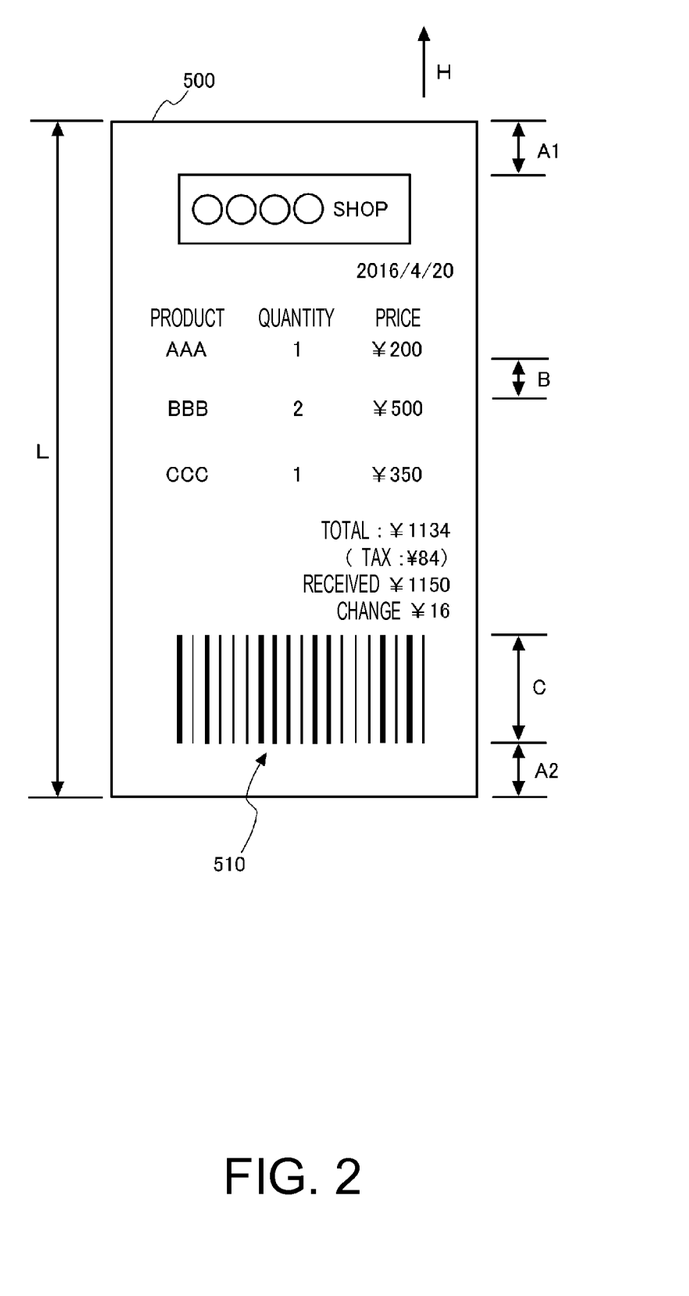
FIG. 2 illustrates a receipt.

A receipt 500 printed by the printer 200 is described next. FIG. 2 shows an example of a receipt 500.

Figure 3:
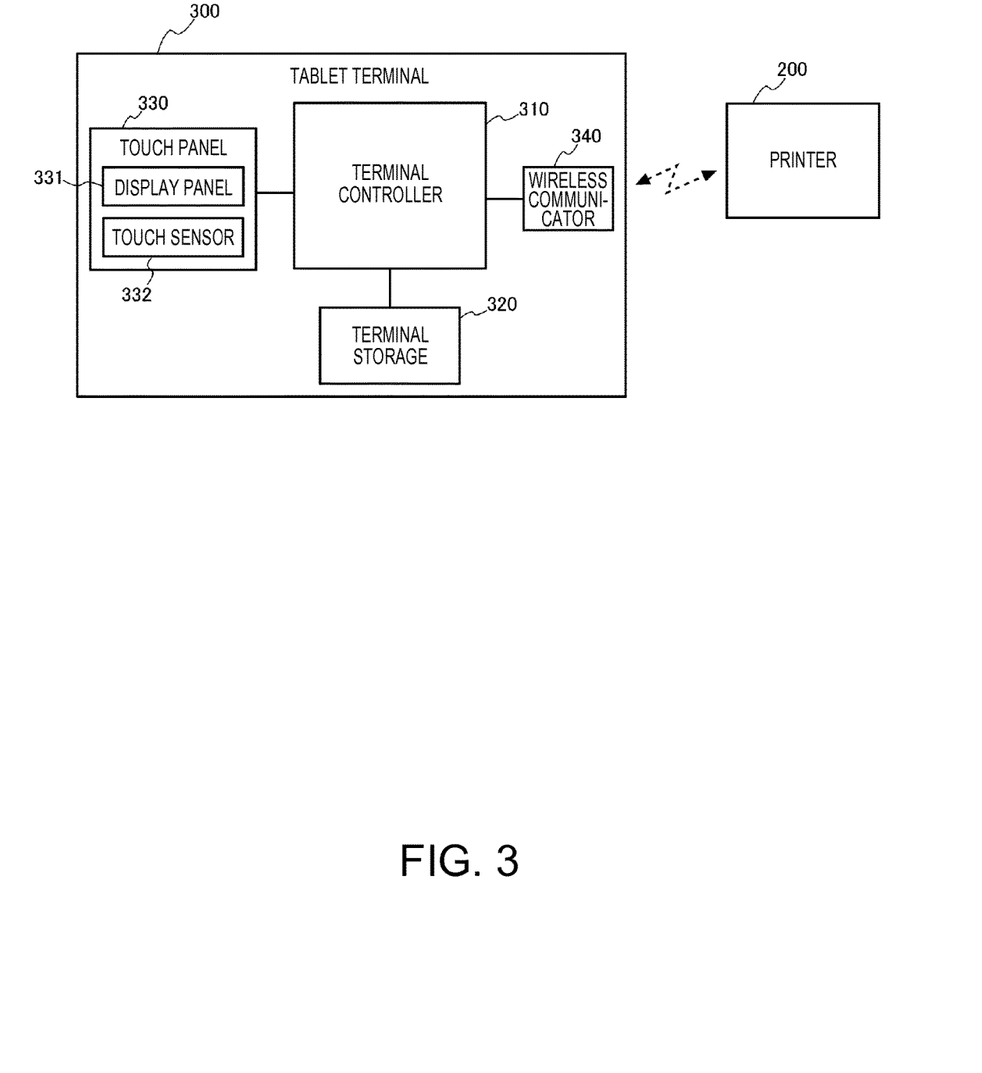
FIG. 3 is a block diagram illustrating the functional configuration of a tablet terminal.

The print unit 240 executes the printing process, which involves printing one line at a time by a thermal head 241, which has heat elements arrayed in a line, while conveying the roll paper by the conveyance mechanism in the conveyance direction (referred to as conveyance direction H, the direction of arrow H in FIG. 3).

Margins (A1, A2 in FIG. 2) are formed at the top and the bottom of the receipt 500. The top is the end at the leading end of the receipt 500 in the conveyance direction H. The bottom is the end of the receipt 500 at the trailing end in the conveyance direction H. A logo identifying the shop where the product was purchased, and the date of the transaction, are printed on the receipt 500. Also printed on the receipt 500 are the name, quantity, and unit price of the purchased products, as well as the total purchase amount, applicable taxes, amount received from the customer, and the change due, printed as text. A barcode image 510 is also printed on the receipt 500. Included in the barcode image 510 are such information as a store code, checkout register, date, and receipt number (transaction number) that are also printed on each receipt 500.

The paper-saving process of the reduction processor 222 is described next with reference to the receipt 500 in FIG. 2.

Reducing the length of a margin is a process of reducing the width (length; dimensions A1 and A2 in FIG. 2) in the conveyance direction of the white space formed at the top and bottom of the receipt 500. The reduction processor 222 compares the margin width set in the configuration file 212 with the previously set minimum margin width. The minimum margin width is the width of the smallest margin that can be formed in order to print a receipt 500. The reduction processor 222 compares the margin width set in the configuration file 212 with the minimum margin width, and determines the width of the margin can be reduced if the margin width in the configuration file 212 is greater than the minimum margin width.

If the reduction processor 222 determines a margin can be reduced, it reduces the width of the margin of the receipt 500. To reduce the margin at the top of the receipt 500, the reduction processor 222 changes the line where printing starts. For example, to reduce the width of the receipt 500 margin to the minimum margin width, the reduction processor 222 controls the print unit 240 to convey the roll paper the conveyance distance equal to the minimum margin width, renders the image data in the print buffer 203, and starts printing.

To reduce the margin at the bottom of the receipt 500, the reduction processor 222 changes the cutting position, that is, where the roll paper is cut. For example, if the number of lines corresponding to the minimum margin width is 150, after printing the print image on the roll paper, the reduction processor 222 conveys the roll paper the distance equal to 150 lines, and then instructs the print unit 240 to cut the roll paper.

Reducing the line spacing (the spacing between lines) is a process of reducing the spacing between lines printed adjacently on the receipt 500 (dimension B in FIG. 2). The reduction processor 222 reduces the line spacing by changing the number of steps indicating the length the roll paper is advanced to print the next line after printing the print image of one line on the roll paper.

When executing the paper-saving process, the reduction processor 222 determines if the line spacing set in the configuration file 212 greater than a previously set minimum line spacing. If the line spacing set in the configuration file 212 is greater than the minimum line spacing, the reduction processor 222 determines the line spacing can be reduced. If the reduction processor 222 determines the line spacing can be reduced, it controls the print unit 240 to reduce the line spacing.

The reduction processor 222 reduces the line spacing by reducing the number of steps the stepper motor drives to shorten the distance the roll paper is conveyed. The number of steps corresponds to the length the roll paper is conveyed after the print image of one line is printed. For example, the reduction processor 222 sets the number of steps so that the line spacing is reduced to the minimum line spacing. The reduction processor 222 may alternatively set the number of steps so that the line spacing is a specific amount less than the line spacing acquired from the configuration file 212.

Reducing the printed height of the barcode image 510 is a process of shortening the length (referred to below as the height) of the printed barcode image 510 in the conveyance direction H. The height of the barcode image 510 is dimension C in FIG. 2. The reduction processor 222 image processes the image data input from the image data generator 221 to shorten the height of the printed barcode image.

When executing the paper-saving process, the reduction processor 222 determines if the height of the barcode image is greater than the minimum height defined by the barcode standard. If the height of the barcode image is greater than the minimum height defined in the standard, the reduction processor 222 image processes the barcode image data to reduce the height of the barcode image. For example, the reduction processor 222 images the barcode image data so that the height of the barcode image matches the minimum height defined in the standard. The reduction processor 222 may also image process the barcode image data to that the height of the barcode image is reduced a specific amount.

The calculator 223 calculates the length of the receipt 500 (referred to below as the first printing length L1) after the paper-saving process is executed. For example, the calculator 223 gets, from the reduction processor 222, the number of steps the stepper motor was driven to print one receipt 500. The calculator 223 calculates this first printing length L1 by multiplying the acquired number of steps by the conveyance distance the roll paper is conveyed when the stepper motor turns one step. Because the stepper motor conveys the roll paper a specific known distance each time the motor turns one step, the first printing length L1 can be calculated by multiplying the number of steps the stepper motor is driven to print one receipt 500, by the distance the media is conveyed per step.

Each time the margin width is reduced, the line spacing is reduced, or the barcode image 510 height is reduced, the calculator 223 calculates the reduction in the length printed in the conveyance direction H of the roll paper (referred to below as the reduced length). The calculator 223 obtains the sum of the reduced length calculated in each process, and obtains the total reduction in the printed length per receipt (referred to below as the total reduced length).

The calculator 223 also adds to the total reduced length calculated for one receipt to the first printing length L1 to calculate the length of the receipt 500 if the paper-saving process had not executed (referred to below as the second printing length L2).

The calculator 223 also calculates the ratio of the first printing length L1 to the second printing length L2 to obtain the reduction rate per unit quantity. The calculator 223 in this embodiment uses one receipt as the unit quantity and calculates the reduction rate per receipt, but the reduction rate may be calculated per roll of roll paper. The calculator 223 may also calculate the roll paper reduction rate for all receipts 500 printed during the service life of the printer 200.

The calculator 223 may also directly calculate the second printing length L2 based on the content of the print data (the text, barcodes, and images contained in the print data), and the configuration file 212.

The calculator 223 stores the calculated first printing length L1, total reduced length, and reduction rate as paper reduction information in RAM. The calculator 223 also stores the first printing length L1, total reduced length, and reduction rate buffered to RAM as paper reduction information in the printer storage 210 before the printer 200 power turns off. The calculator 223 also stores the paper reduction information in printer storage 210 so that this information is related to the other information about receipts printed from the same roll of paper. For example, each time the paper roll in the printer 200 is replaced, the calculator 223 assigns a serial number to the paper roll loaded in the printer 200. The calculator 223 then stores, relationally to the serial number assigned to that paper roll, the first printing length L1, total reduced length, and reduction rate that were calculated. This enables calculating the total reduction in the printing length, and the average reduction rate, for all printouts made from the same single roll of paper.

The calculator 223 also displays the paper reduction information stored to RAM on the display unit 252 when instructed by the user operating the input unit 251. As a result, information such as the reduction in the printing length can be displayed on the printer 200 in the receipt 500 printing process, and the user can easily know how much the printed length of the roll paper was reduced, that is, how much paper was saved.

When a control command requesting paper reduction information is received from the tablet terminal 300, the calculator 223 sends the paper reduction information stored in at least one of the RAM and printer storage 210, and information indicating the paper size registered in the configuration file 212, to the tablet terminal 300 that sent the control command. The paper size includes information indicating the width of the roll paper used in the printer 200.

The print unit 240 includes the mechanisms used to print a print image on the roll paper. More specifically, the print unit 240 includes a conveyance mechanism for conveying the roll paper stored inside the case of the printer 200 to the printing position; a print mechanism for printing images by forming dots on the roll paper with a thermal head (printhead) 241; and a cutter mechanism for cutting the roll paper at a specific position. The thermal head 241 is a device having heat elements arrayed in a line, and prints on the print medium by selectively applying potential to drive specific heat elements and apply heat to form specific dots on the print medium according to the printed image.

The print unit 240 prints the print image rendered in the print buffer 203 on the roll paper as controlled by the printer controller 220.

The input unit 251 has operating switches (not shown in the figure), detects operation of the operating switches, and outputs an operation signal corresponding to the detected operation to the printer controller 220.

The display unit 252 has LEDs (not shown in the figure), and turns the LEDs on/off as controlled by the printer controller 220.

The wireless communicator 260 communicates wirelessly with an external device (the tablet terminal 300 in this example) as controlled by the printer controller 220. The wireless communicator 260 may communicate wirelessly in the infrastructure mode of a wireless LAN communicating through an access point, in a wireless LAN ad hoc mode communicating without going through an access point, or by Bluetooth®, Wireless USB, or other near-field communication method.

FIG. 3 is a block diagram illustrating the configuration of the tablet terminal 300.

The tablet terminal 300 includes a terminal controller 310, terminal storage 320, touch panel 330, and wireless communicator 340. The terminal storage 320 is an example of control device-side storage.

The terminal controller 310 includes a CPU, ROM, RAM, and other peripheral circuits not shown, and controls other parts of the tablet terminal 300.

A basic control program (operating system) that is run by the CPU is stored in ROM, and application programs are stored in the terminal storage 320. The basic control program and application programs are read into RAM, and the CPU controls parts of the tablet terminal 300 by executing the basic control program and application programs from RAM.

When a request to display the reduction in the printed length of roll paper by the paper-saving process in the printing process of the printer 200 is received through the touch panel 330, the terminal controller 310 controls the wireless communicator 340 to send a control command requesting the paper reduction information to the printer 200. When the paper reduction information is received from the printer 200, the terminal controller 310 calculates a value representing the roll paper reduction effect based on the received paper reduction information.

In this example, the terminal controller 310 calculates, as a value representing the roll paper reduction effect, the reduction in the printed length of the roll paper, or the average reduction rate, when printing receipts using a single roll of roll paper. The paper reduction information received from the printer 200 is related to the serial number assigned to the paper roll. The terminal controller 310 sums the total reduced length of the receipts related to the same serial number, and calculates the total reduction in the printed length (referred to below as the 1-roll length reduction) when printing receipts using a single (the same) roll of roll paper. The terminal controller 310 also calculates the average reduction rate of all receipts related to the same serial number. The terminal controller 310 stores the calculated 1-roll length reduction and average reduction rate in the terminal storage 320.

The terminal controller 310 may also calculate, as a value indicating roll paper reduction effect, the reduction in the area of roll paper consumed, and the cost of the roll paper corresponding to the reduction in the area of roll paper consumed for printing. Further alternatively, the terminal controller 310 may calculate, as a value indicating the roll paper reduction effect, the number of trees required to produce the amount (area) of roll paper that was saved, or the reduction in the amount of $CO_2$ corresponding to the reduction in the amount (area) of roll paper consumed.

The terminal controller 310 acquires by the area of roll paper by multiplying the width of the roll paper indicated by the paper size received with the paper reduction information by the total reduced length contained in the received paper reduction information. The terminal storage 320 stores information such as the cost per unit area of the roll paper, the number of trees required to produce that area of roll paper, or the reduction in the amount of $CO_2$ per unit area of roll paper. The terminal controller 310 references the information stored by the terminal storage 320, and calculates a value indicating the roll paper reduction effect. The terminal controller 310 stores the calculated value indicating the roll paper reduction effect in the terminal storage 320.

Note that this embodiment describes the terminal controller 310 of the tablet terminal 300 calculating the reduction in the area of roll paper consumed, or calculating the cost of roll paper equal to the reduction in the area of roll paper consumed, but this information may be calculated by the calculator 223 of the printer 200 and displayed on the display unit 252.

The terminal controller 310 displays a value representing the calculated reduction effect, or the information received as the paper reduction information, on the touch panel 330. The reduction in the printed length (total reduced length) of each receipt, or the reduction rate per receipt, resulting from the paper-saving process may also be included in the information the terminal controller 310 receives as the paper reduction information.

The terminal storage 320 is EEPROM, flash memory, or other type of nonvolatile memory device. The terminal storage 320 stores information received from the printer 200. In this example, the terminal storage 320 stores the paper reduction information.

The terminal storage 320 also stores information used by the terminal controller 310 to calculate values representing the roll paper reduction effect. The terminal storage 320 stores, as information used to calculate values representing the roll paper reduction effect, the cost per unit area of the roll paper, the number of trees required to produce a unit area of roll paper, and the reduction in $CO_2$ corresponding to the unit area of roll paper.

The touch panel 330 includes an LCD panel or other type of display panel 331, and a touch sensor 332 disposed to the display panel 331. The display panel 331 displays images and content as controlled by the terminal controller 310. The touch sensor 332 detects touch operations and outputs to the terminal controller 310. The terminal controller 310 also executes processes corresponding to the touch operation based on input from the touch sensor 332. The display panel 331 is an example of a display means.

The wireless communicator 340 communicates wirelessly with external devices (the printer 200 in this example) as controlled by the terminal controller 310. The wireless communicator 340 may communicate wirelessly in the infrastructure mode of a wireless LAN communicating through an access point, in a wireless LAN ad hoc mode communicating without going through an access point, or by Bluetooth®, Wireless USB, or other near-field communication method.

Figure 4:
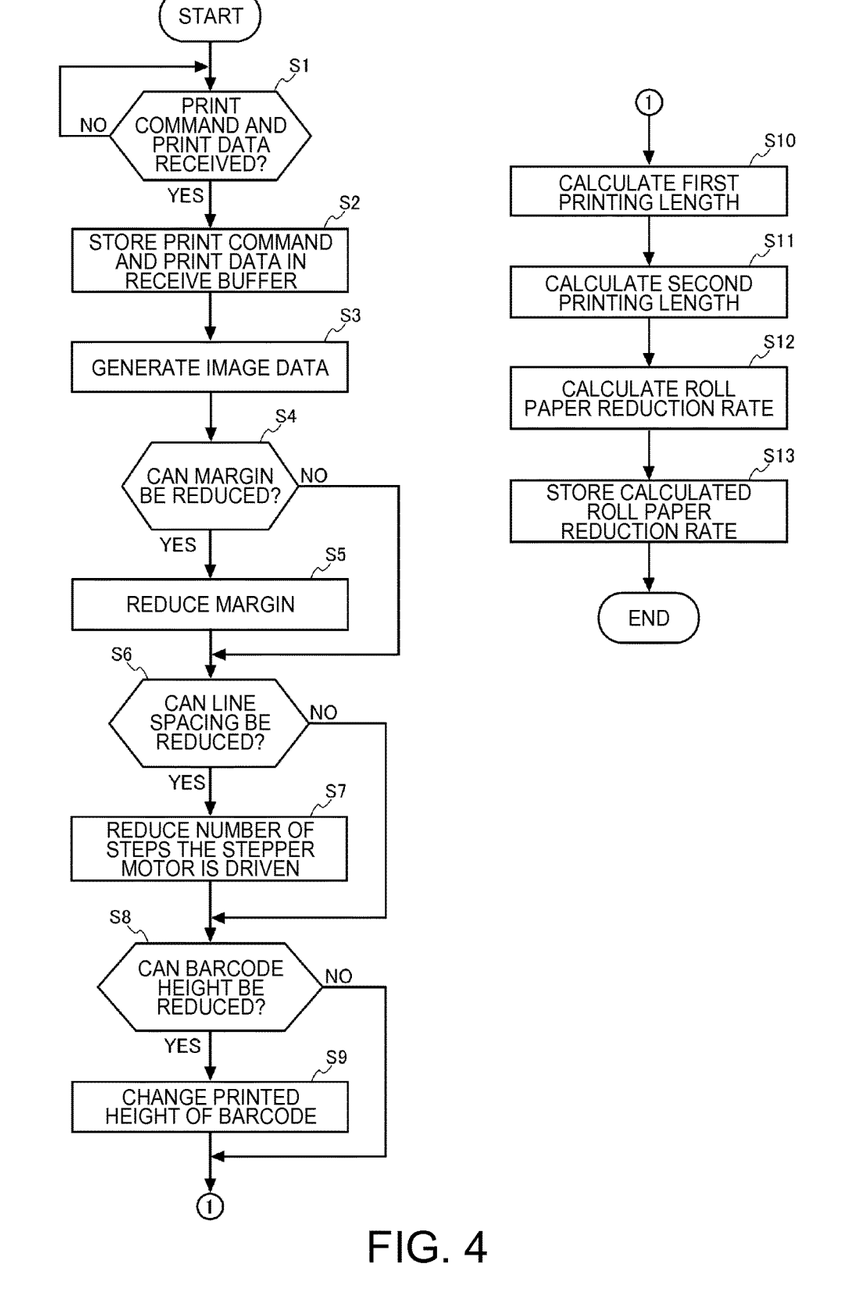
FIG. 4 is a flow chart of the operation of the printer in a printing process.

FIG. 4 is a flow chart of the operation of the printer 200. More particularly, FIG. 4 is a flow chart of the operation of the printer 200 when a print command and print data are received from the host device 100.

If a print command and print data has not been received from the host device 100 (step S1: NO), the printer 200 waits until a print command and print data are received from the host device 100. When a print command and print data are received from the host device 100, (step S1: YES), the printer 200 stores the received print command and print data in the receive buffer 202 (step S2).

Once print commands and print data are stored in the receive buffer 202, the image data generator 221 of the printer controller 220 acquires the print commands from the receive buffer 202 and interprets the acquired print commands. Based on the print data and the result of interpreting the print commands, the image data generator 221 generates image data rendered in the print buffer 203. The image data generator 221 then outputs the generated image data to the reduction processor 222.

The reduction processor 222 executes the paper-saving process when image data is input from the image data generator 221 and the operating mode of the printer 200 is the paper-saving mode.

First, the reduction processor 222 determines if the size of the top or bottom margin of the receipt 500 can be reduced (step S4). For example, the reduction processor 222 determines if the margin width set in the configuration file 212 is greater than the previously set minimum margin width to determine if the length of at least one of the top and bottom margins of the receipt 500 can be reduced. If the margin width cannot be reduced, that is, if the margin width set in the configuration file 212 is the same as the minimum margin width, (step S4: NO), the reduction processor 222 goes to step S6. If the margin width can be reduced, that is, if the margin width set in the configuration file 212 is greater than the minimum margin width set in the configuration file 212 (step S4: YES), the reduction processor 222 reduces the length of the margin at the end determined to be reducible (step S5).

The reduction processor 222 changes the line from which the print unit 240 starts printing the print image to change the length of the top margin of the receipt 500. The reduction processor 222 also reduces the number of lines where an image is not printed after the print unit 240 finishes printing the print image, and instructs the print unit 240 to cut the roll paper at the new cutting position.

Next, if the image data generated by the image data generator 221 is font data, the reduction processor 222 determines if the line spacing can be reduced (step S6).

The reduction processor 222 determines whether or not the line spacing can be reduced by, for example, determining if the line spacing set in the configuration file 212 is greater than a previously set minimum line spacing. If the reduction processor 222 determines the line spacing set in the configuration file 212 is greater than the previously set minimum line spacing (step S6: YES) and the line spacing can be reduced, the reduction processor 222 reduces the line spacing determined to be reducible. The reduction processor 222 then reduces the number of steps the stepper motor is driven (step S7) to reduce the conveyance distance the roll paper is conveyed, and reduces the line spacing. If the line spacing cannot be reduced, that is, if the line spacing set in the configuration file 212 is the same as the minimum line spacing (step S6: NO), the reduction processor 222 goes to step S8.

Next, if the image data generated by the image data generator 221 is image data for a barcode, the reduction processor 222 determines if the height of the barcode image can be reduced (step S8). The reduction processor 222 compares the height of the barcode image with the minimum height defined by the barcode standard to determine if the height of the barcode image can be reduced. If the height of the barcode image is greater than the minimum height defined by the standard, the reduction processor 222 determines that the height of the barcode image can be reduced (step S8: YES). If the height can be reduced, the reduction processor 222 image processes the barcode image data to reduce the height of the barcode image (step S9). If the height of the barcode image cannot be reduced, that is, if the height of the barcode image is equal to the minimum height defined by the standard (step S8: NO), the reduction processor 222 goes to step S10.

Next, the calculator 223 calculates the first printing length L1 by multiplying the number of times the roll paper was conveyed by the conveyance length, which is calculated from the number of steps the stepper motor was driven (step S10).

The calculator 223 also calculates the length of paper saved (the reduction length) by the processes reducing the end margins, reducing the line spacing, and reducing the barcode height, sums the calculated reduction lengths, and calculates the total reduced length (total paper savings). Next, the calculator 223 adds the calculated total reduced length to the first printing length L1 to get the second printing length L2 (step S11). Next, the calculator 223 calculates the reduction rate, which is the ratio of the first printing length L1 to the second printing length L2 (step S12).

Once the first printing length L1, total reduced length, and second printing length L2 are calculated, the calculator 223 stores the calculated information as the paper reduction information in RAM (step S13). When an operating switch of the input unit 251 is operated to turn the power of the printer 200 off, the calculator 223 writes the paper reduction information from RAM to the printer storage 210.

Figure 5:
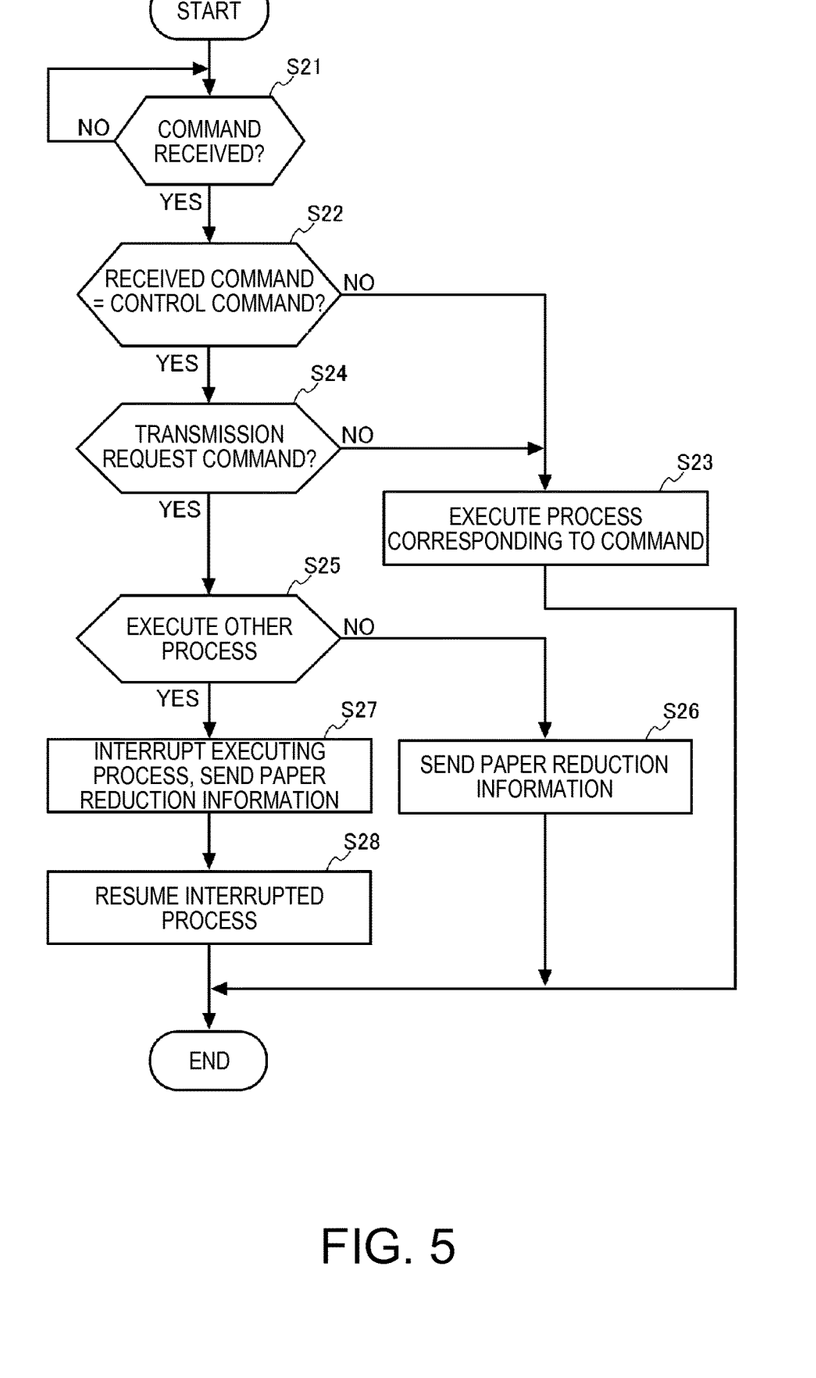
FIG. 5 is a flow chart of the operation of the printer when a command is received.

Operation of the printer 200 when a command is received from the tablet terminal 300 is described next with reference to the flow chart in FIG. 5. FIG. 5 is a flow chart of an operation of the printer 200.

When a command is not received, (step S21: NO), the printer controller 220 of the printer 200 simply waits until a command is received (repeats step S21).

When a command is received (step S21: YES), the printer controller 220 determines if the received command is a control command (step S22).

A control command as used here is, for example, a command instructing the printer 200 to perform an operation other than the printing process. Commands for operations other than the printing process may include commands for acquiring printer 200 status or version information from the printer 200, and commands to change the operating mode of the printer 200. If the printer controller 220 determines the received command is not a control command (step S22: NO), the printer controller 220 executes the process called by the received command, such as the printing process (step S23).

If the received command is a control command, (step S22: YES), the printer controller 220 then determines if the received command is a transmission request received from the tablet terminal 300 (step S24).

A transmission request is a control command requesting transmission of the paper reduction information generated by the printer 200 to the tablet terminal 300. The transmission request (command) is an immediate execution command (a command that executes immediately upon receipt), and if another process, such as the printing process, is executing when the transmission request command is received, the transmission request command requires interrupting the executing process and executing the process called by the transmission request command.

If the received command is not a transmission request command, (step S24: NO), the printer controller 220 executes the process corresponding to the received command if another process is not already running (step S23). If another process is already running, the printer controller 220 waits until that process ends and then executes the process corresponding to the received command (step S23).

If the received command is a transmission request command, (step S24: YES), the printer controller 220 determines if the printing process or other process is not already running (step S25). If another process is running (step S25: YES), the printer controller 220 interrupts the executing process, reads the paper reduction information from printer storage 210 or RAM, and controls the wireless communicator 260 to send the read paper reduction information to the tablet terminal 300 (step S27). When sending the paper reduction information to the tablet terminal 300 ends, the printer controller 220 resumes the interrupted process (step S28), and when the resumed process ends, ends the process shown in FIG. 5.

If another process is not running (step S25: NO), the printer controller 220 reads the paper reduction information from printer storage 210 or RAM, and controls the wireless communicator 260 to send the read paper reduction information to the tablet terminal 300 (step S26).

Figure 6:
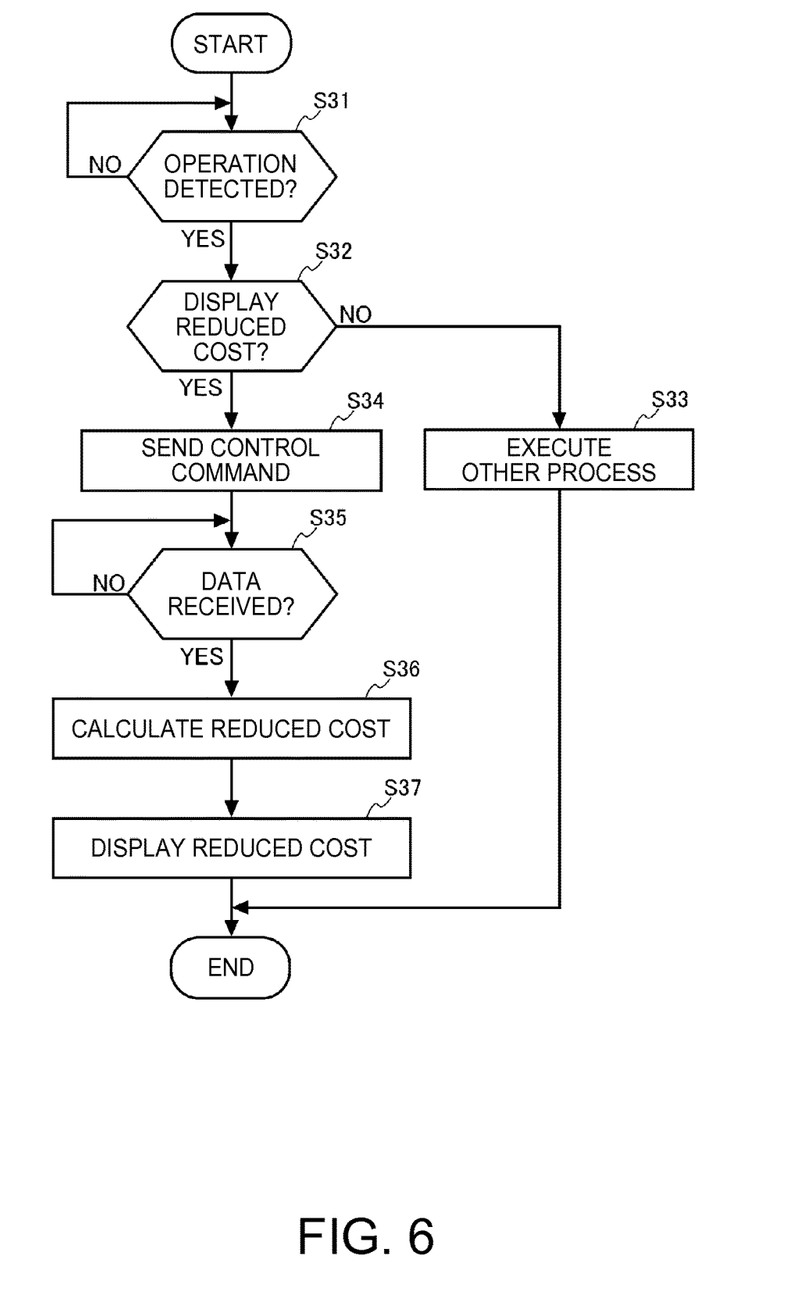
FIG. 6 is a flow chart of the operation of the tablet terminal.

FIG. 6 is a flow chart of an operation of the tablet terminal 300. This process describes displaying on the tablet terminal 300 the reduction in the cost of roll paper, which is calculated based on the reduction achieved, by the paper-saving process, in the length of roll paper that is printed, as a value indicating the reduction effect, but other values indicating the effect of the paper-saving process are processed in the same way.

The terminal controller 310 of the tablet terminal 300 monitors input to the touch sensor 332 and determines if a user operation was detected. If a user operation is not detected (step S31: NO), the terminal controller 310 waits until a user operation is detected.

When a user operation is detected (step S31: YES), the terminal controller 310 determines if the detected operation is a display request to display the cost reduction (step S32). If the terminal controller 310 determines the detected operation is not a request to display the cost reduction (step S32: NO), the terminal controller 310 executes another process corresponding to the operation detected by the touch sensor 332 (step S33).

If the terminal controller 310 determines the detected operation is a request to display the cost reduction (step S32: YES), the terminal controller 310 generates a control command requesting transmission of the paper reduction information, and sends the generated control command through the wireless communicator 340 to the printer 200 (step S34).

Next, the terminal controller 310 determines if data was received from the printer 200. If data was not received from the printer 200 (step S35: NO), the terminal controller 310 waits until data is received.

If data was received from the printer 200 (step S35: YES), the terminal controller 310 acquires the paper reduction information from the received data. Based on the acquired paper reduction information, the terminal controller 310 calculates the cost reduction. The terminal controller 310 references information stored in the terminal storage 320 to calculate the cost reduction (step S36). The terminal controller 310 stores the cost reduction in the terminal storage 320, and displays the calculated cost reduction on the display panel 331 (step S37).

An embodiment applying the printing device, printing system, and control method of a printing device according to the invention as described above includes the print unit 240, reduction processor 222, calculator 223, and printer storage 210.

The print unit 240 conveys the roll paper in the conveyance direction H, and prints images on the roll paper based on a received print command.

The reduction processor 222 controls the print unit 240 to reduce the length of roll paper printed in the conveyance direction H by the print commands.

The calculator 223 calculates the reduction by the reduction processor 222 in the length of roll paper that is printed.

The display unit 252 displays information indicating the reduction in the printed length of roll paper calculated by the calculator 223.

The reduction in the printed length of roll paper, that is, the length of roll paper that was saved, can therefore be easily known.

The reduction processor 222 reduces the length of roll paper printed in the conveyance direction H by the print commands by doing at least one of reducing the length of one or both margins in the conveyance direction H, reducing the height of barcodes in the conveyance direction H, and reducing the spacing between lines (line spacing). The length of roll paper that is printed when printing on the roll paper can therefore be beneficially reduced.

The calculator 223 calculates the reduction rate of roll paper per unit quantity based on the reduction by the reduction processor 222 in the printed length of roll paper; and the display unit 252 displays information indicating the roll paper reduction rate calculated by the calculator 223. How much roll paper consumption was reduced compared with when the printed length of roll paper in the conveyance direction H is not reduced in the printing process can therefore be shown.

Information related to the width of the roll paper is also stored, and the calculator 223, based on the reduction in the printed length of roll paper by the reduction processor 222, and information related to the width of the roll paper, calculates the reduction by the reduction processor 222 in the area of roll paper consumed, and the display unit 252 displays information indicating the reduction in the area of roll paper consumption calculated by the calculator 223. How much consumption of roll paper was reduced can therefore be expressed by the roll paper area that was saved.

The calculator 223 also calculates a first printing length, which indicates the printed length of roll paper when the length printed in the conveyance direction H of the roll paper was reduced by the reduction processor 222, and a second printing length, which indicates the length of roll paper that would be consumed if the length printed in the conveyance direction H of the roll paper was not reduced. The calculator 223 also calculates a ratio of the first printing length to the calculated second printing length. How much roll paper consumption was reduced compared with not reducing the length printed in the conveyance direction H can therefore be shown.

The printer 200 can connect to the tablet terminal 300, and the reduction processor 222, based on a control command received from the tablet terminal 300, sends information indicating the reduction in the printed length of roll paper to the tablet terminal 300.

The tablet terminal 300 can therefore be made to acquire information indicating the reduction in the printed length of roll paper, and the tablet terminal 300 can display the acquired information or execute processes using the acquired information.

The printer 200 has RAM that temporarily stores information indicating the reduction in the printed length of roll paper calculated by the calculator 223, and printer storage 210 that cumulatively stores information indicating the reduction in the printed length of roll paper calculated by the calculator 223.

Based on a control command received from the tablet terminal 300, the reduction processor 222 sends to the tablet terminal 300 information indicating the reduction in the printed length of roll paper stored in RAM, or information indicating the reduction in the printed length of roll paper stored in printer storage 210.

As a result, the reduction in the total length of receipts 500 printed between when the printer 200 turned on and then turned off can be displayed on the tablet terminal 300. The tablet terminal 300 can also, for example, calculate and display the cumulative total reduction in the length of roll paper that was printed.

A control command as used herein is a real-time process command defined to be executed with priority over normal commands, including commands instructing printing to roll paper.

Therefore, even if the printer 200 is executing another process, the printer 200 can be controlled to transmit information indicating the reduction in the printed length of roll paper with priority over the executing process.

The invention is described with reference to a preferred embodiment thereof, but is not limited to the foregoing embodiment and can be modified and adapted in many ways without departing from the scope of the accompanying claims.

For example, the printer 200 in the embodiment described above is a thermal printer, but the invention is not so limited and can be applied to inkjet printers, for example.

The paper-saving process described above shortens end margins, reduces the line spacing, or reduces the printed height of barcodes, but may also reduce white space created by carriage returns. The amount of white space created by a carriage return is also set in the print commands received from the host device 100. The reduction processor 222 can reduce the printed length of roll paper by shortening the amount of white space created by carriage returns to less than the white space setting in the configuration file.

Both a host device 100 and tablet terminal 300 are described in the embodiment described above, but functions of the host device 100 may be rendered by the tablet terminal 300. For example, the tablet terminal 300 may send print commands to the printer 200. In this event, the host device 100 may be omitted from the printing system 1, and the printing system 1 may include only the printer 200 and tablet terminal 300.

The process units of the flow charts shown in FIG. 4 to FIG. 6 are separated by the main process content to clarify the processes executed by the printer controller 220 of the printer 200 and the terminal controller 310 of the tablet terminal 300. However, the invention is not limited by the method of segmenting and the names given to the process units. The processes of the printer controller 220 and terminal controller 310 can be further divided according to the process content into more process units. The order of steps in the foregoing flow charts is also not limited to the order shown.

The function units shown in FIG. 1 and FIG. 3 represent functional configurations, and the actual embodiment thereof is not so limited. More specifically, hardware components corresponding individually to each function unit are not necessarily required, and configurations in which a single processor embodies the functions of multiple function units by executing a specific program or programs are obviously conceivable. Some functions embodied by software in the foregoing embodiments may instead be embodied by hardware, and some functions embodied by hardware in the foregoing embodiments may instead be embodied by software. The specific detailed configurations of the host device 100, printer 200, tablet terminal 300, and other parts can also be varied as desired without departing from the scope of the invention.

What is claimed is:

1. A printing device comprising:
a print unit configured to convey roll paper in a conveyance direction and print images on the roll paper based on a received print command;
a controller configured to control the print unit to reduce the length of roll paper printed in the conveyance direction based on the print command;
a calculator that computes the reduction by the controller in the printed length of roll paper; and
a display unit that displays information indicating the reduction in the printed length of roll paper calculated by the calculator.

2. The printing device described in claim 1, wherein:
the controller reduces the length of the roll paper printed by the print command in the conveyance direction by executing at least one of reducing a margin in the conveyance direction, shortening a barcode height in the conveyance direction, and reducing the line spacing.

3. The printing device described in claim 1, wherein:
the calculator calculates a reduction rate in the roll paper per unit quantity based on the reduction by the controller in the printed length of the roll paper; and
the display unit displays information indicating the roll paper reduction rate calculated by the calculator.

4. The printing device described in claim 1, further comprising:
storing information related to the width of the roll paper;
the calculator calculating the reduction by the controller in the area of roll paper consumed based on the reduction by the controller in the printed length of the roll paper, and the stored information related to the width of the roll paper;
and the display unit displaying information indicating the reduction in the area of the roll paper consumed calculated by the calculator.

5. The printing device described in claim 1, wherein:
the printing device can connect to a control device; and
the controller, based on a control command received from the control device, sends to the control device information indicating the reduction in the printed length of roll paper.

6. The printing device described in claim 5, wherein:
the printing device has volatile storage that temporarily stores information indicating the reduction in the printed length of roll paper calculated by the calculator, and
nonvolatile storage that cumulatively stores information indicating the reduction in the printed length of roll paper calculated by the calculator; and
the controller, based on a control command received from the control device, sends to the control device information stored in the volatile storage indicating the reduction in the printed length of roll paper calculated by the calculator, or the cumulative information stored in the nonvolatile storage indicating the reduction in the printed length of roll paper calculated by the calculator.

7. A printing system comprising a printing device and a control device connected to the printing device;
the printing device including a print unit configured to convey roll paper in a conveyance direction and print images on the roll paper based on a received print command;
a printing device controller configured to control the print unit to reduce the length of roll paper printed in the conveyance direction based on the print command;
a calculator that computes the reduction by the printing device controller in the printed length of roll paper; and
a display unit that displays information indicating the reduction in the printed length of roll paper calculated by the calculator;
the printing device controller sending to the control device information indicating the reduction in the printed length of roll paper; and
the control device including a terminal controller that calculates a value representing the roll paper reduction effect based on information received from the printing device indicating the reduction in the printed length of roll paper; and
a terminal display unit that displays the value representing the roll paper reduction effect calculated by the terminal controller.

8. A control method of a printing device configured to convey roll paper in a conveyance direction and print images on the roll paper based on a received print command, comprising:

controlling printing to reduce the length of roll paper printed in the conveyance direction based on the print command;

computing the reduction in the printed length of roll paper; and displaying information indicating the printed length of roll paper that was calculated.

\* \* \* \* \*